UNITED STATES PATENT OFFICE.

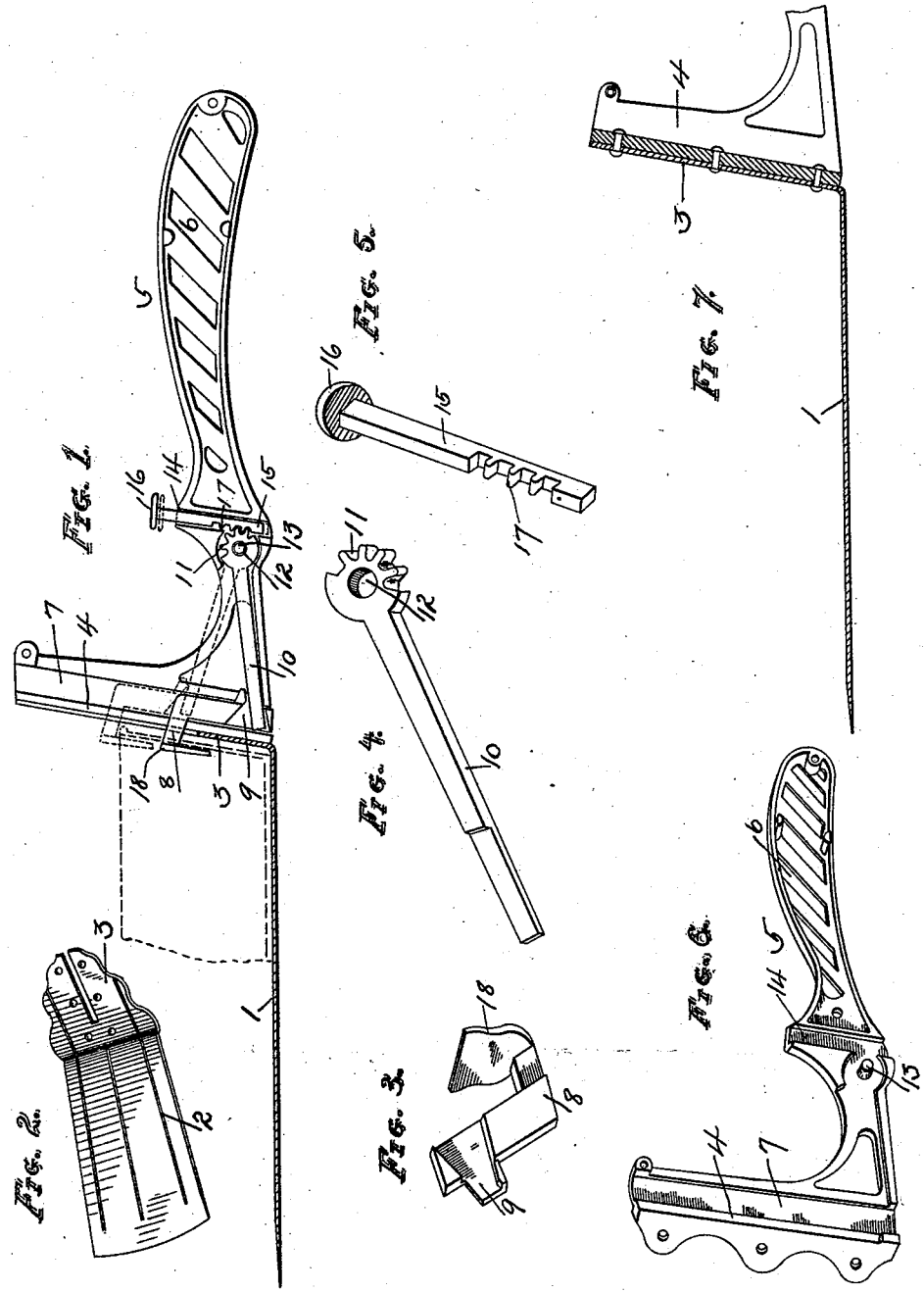

WILLIAM REISSE, OF ST. LOUIS, MISSOURI.

PAN-LIFTER.

SPECIFICATION forming part of Letters Patent No. 548,092, dated October 15, 1895.

Application filed June 7, 1894. Renewed September 18, 1895. Serial No. 562,897. (No model.)

*To all whom it may concern:*

Be it known that I, WILLIAM REISSE, a citizen of the United States, and a resident of St. Louis, State of Missouri, have invented certain new and useful Improvements in a Pan-Lifter, of which the following is a full, clear, and exact description, reference being had to the accompanying drawings, forming a part hereof.

My invention relates to improvements in a pan-lifter; and it consists in the novel construction and combination of parts, as will be more fully hereinafter described, and set forth in the claims.

The object of my improvement is to construct an improved device of this class for the handling of hot oven or stove pans to prevent the burning of the hands, as is usually the case when such pans are removed by the old method.

In this invention I have tried to combine simplicity with durability and strength, and it is believed that these features have been properly combined to make the device a success.

In the drawings, Figure 1 is a longitudinal sectional view of my complete invention. Fig. 2 is a perspective view of a shovel portion. Fig. 3 is a perspective view of the clamping device. Fig. 4 is perspective view of the manipulating-lever. Fig. 5 is a similar view of the rack-pin. Fig. 6 is a perspective view of one half of the handle and the brace forming a part thereof. Fig. 7 is an enlarged sectional view showing the connection of the brace with the shovel.

Referring to the drawings, 1 indicates a shovel-blade, the same being of about the form shown in Fig. 2 and made of any ordinary material suitable for the purpose, and said blade being provided with a number of indented ribs 2, which strengthen the same for the purpose for which it is intended.

Extending at an angle slightly less than a right angle is a back 3, which is riveted to the brace 4 of the handle portion 5. This handle 5 consists of two parts, one right and one left, and substantially of the form as shown in Fig. 6, the handle proper being provided with a number of openings 6, which prevent the handle from retaining too great a heat. A bearing 7 is provided by the brace portion 4 for a reciprocatory clamping device 8, which is provided with a depression 9, forming a guide for the end of the manipulating bar or lever 10. (Shown in Fig. 4.) This bar at its rear end is provided with a number of teeth 11 and an opening 12, which is adapted to fit over a stud 13, provided by one member of the handle 5.

A vertical slot 14 in the handle 5 provides a bearing for a rack-pin 15, upon the upper end of which is a finger-plate 16, the teeth 17 adapted to engage the teeth 11 upon the bar 10.

The clamp 8 has a projecting ear 18, which, in relation to the other parts, holds the position as shown in Fig. 1, and is adapted to engage the inner side of the pan, which is upon the shovel 1 when in position.

The object of the device is extremely simple, the same consisting of the vertical manipulation of the pin 15.

It will easily be seen by reference to Fig. 1 that by pushing downwardly upon the pin 15 the bar 10 is raised upwardly, thus causing the clamp 8 to rise and the ear 18 to be in position to engage a pan.

The weight of the clamp 8 and bar 10 causes these two parts, as well as the pin 15, to resume the position shown by solid lines in Fig. 1 after the pan has been removed from the shovel, and the parts are then in position for a repetition of the operation above described.

It is thus obvious that the application of this device for the lifting of baking and cooking pans is very simple, as the shovel 1, being tapered and of great strength, can be easily inserted by pushing upon the handle under the pan until the end or edge of the pan reaches the back portion 3 of the shovel. During this portion of the operation the thumb or finger is upon the pin 15, thus holding the parts up, so that when the pan has reached its farthest movement upon the shovel the clamp 8 drops and the ear 18 engages the pan, as above described.

It is now thought that a thorough description of my invention, as well as its operation, has been given and that the statements made regarding the simplicity, durability, and strength of the device have been substantiated.

Having fully described my invention, what I claim is—

In an improved pan lifter the combination of a tapered shovel, a handle secured thereto, a bearing and a vertical slot within said handle, a rack pin adapted to slide in said bearing, teeth upon said rack, a reciprocating arm pivoted in said handle, teeth upon said arm meshing with the teeth of said rack pin, a clamp loosely secured to said reciprocating arm adapted to slide in the slot of the vertical portion of the handle, substantially as shown and described.

In testimony whereof I affix my signature in the presence of two witnesses.

WILLIAM REISSE.

Witnesses:
HERBERT S. ROBINSON,
GEORGE S. TOURVILLE.